June 9, 1964 R. H. VICKERS 3,136,435
MATERIAL LOADING AND TRANSFERRING VEHICLE
WITH OVERHEAD POWER CABLE
Filed April 5, 1961 2 Sheets-Sheet 2
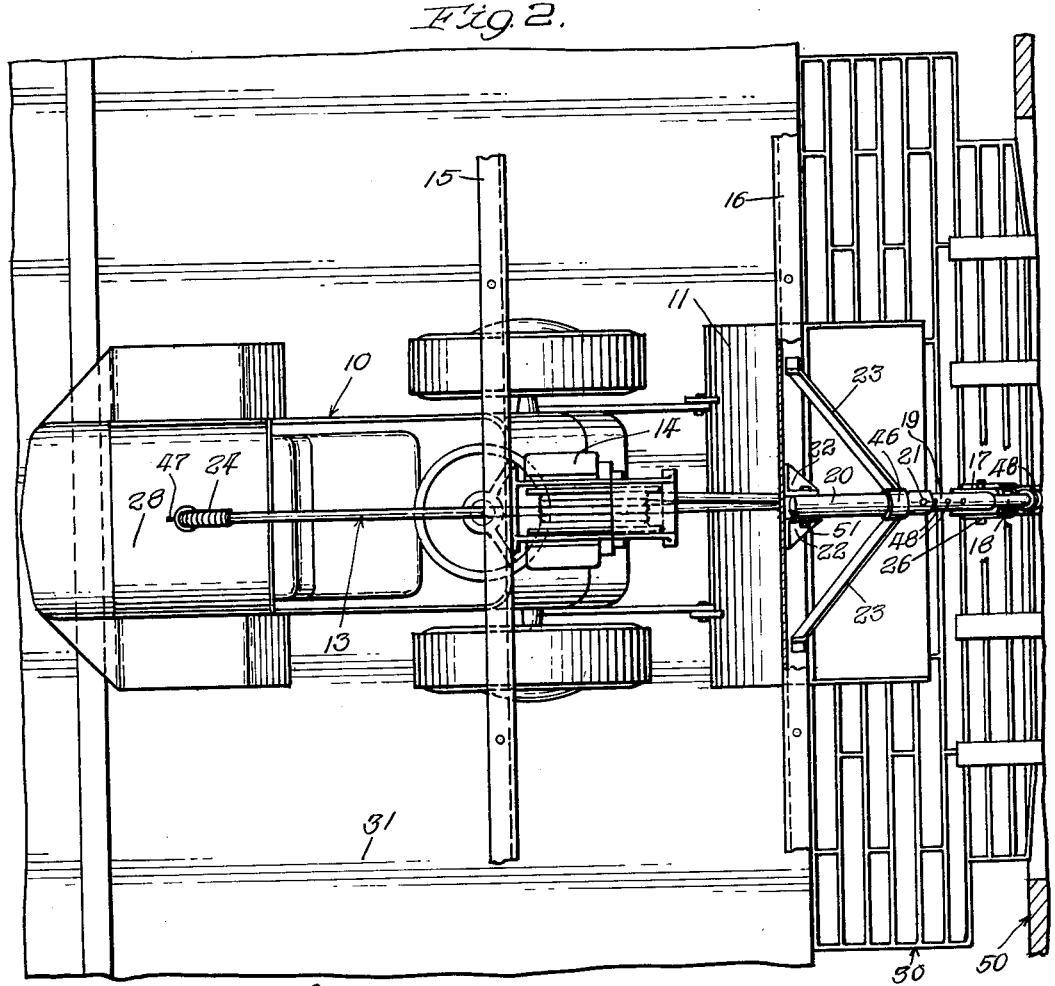
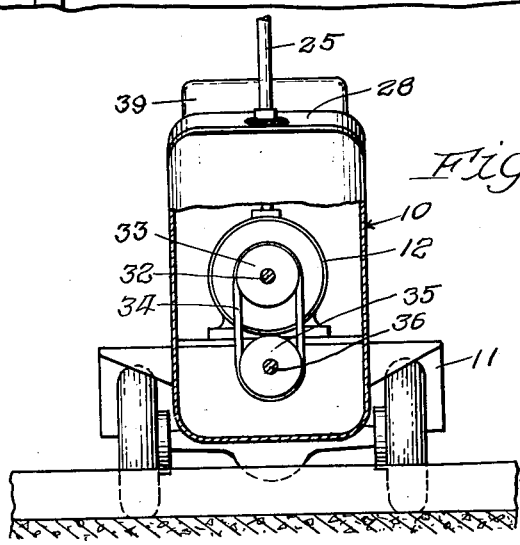
Inventor:
Richard H. Vickers,
By Merriam, Smith & Marshall,
Attys.

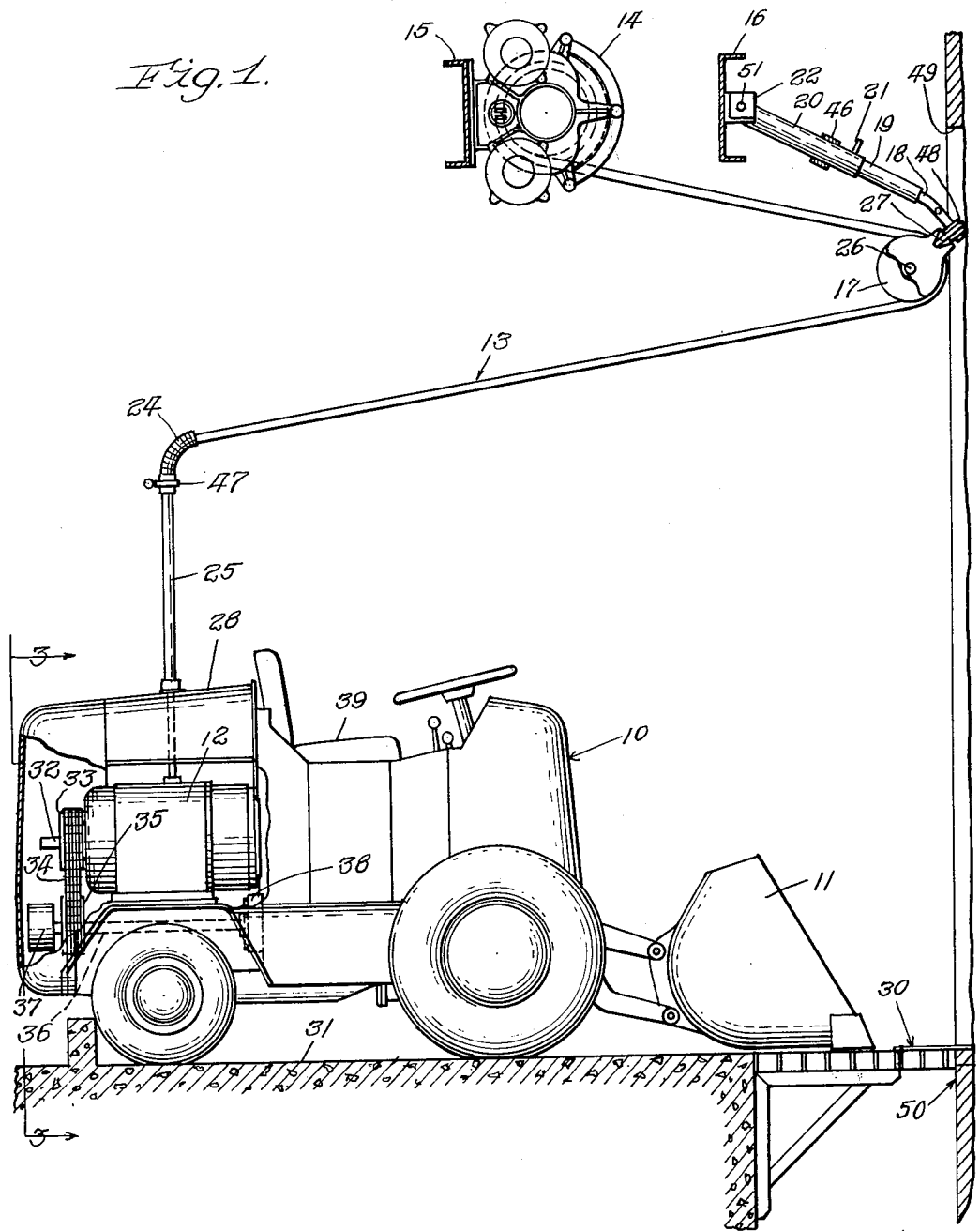

United States Patent Office 3,136,435
Patented June 9, 1964

3,136,435
MATERIAL LOADING AND TRANSFERRING
VEHICLE WITH OVERHEAD POWER CABLE
Richard H. Vickers, Mason City, Iowa, assignor to Allied
Mills, Inc., Chicago, Ill., a corporation of Indiana
Filed Apr. 5, 1961, Ser. No. 100,929
4 Claims. (Cl. 214—131)

The present invention relates generally to material loading and transferring vehicles, such as front loaders, and more particularly to a transferring vehicle which is operated by electricity supplied by an overhead power cable and which is highly maneuverable, requires little maintenance, and can be used in environments made dusty by combustible bulk materials without the danger of igniting these materials.

In a typical embodiment the subject invention may be used to transfer dusty, combustible materials such as grain or other livestock feed ingredients from a first predetermined storage location (such as the interior of a boxcar spotted on a railroad siding) to a second predetermined storage location, such as a hopper or bin. Basically, the vehicle of this embodiment is conventional in external appearance, having a front mounted scoop or loader, and a rear mounted motor. However, in the present invention the motor is electrically operated and is connected to an external power source by an overhead cable. The cable is extendable from or retractable to a spring-tensioned reel mounted above and to one side of the first storage location, and extends from the reel around a sheave located between the reel and the first storage location. This sheave is pivotally mounted on a member which may be raised or lowered toward or away from the first storage location. This feature is particularly advantageous in cases where the height of the boxcar doors vary from one car to another, the member being adjustable so that the sheave extends slightly below the top of the boxcar door, at the same time being above the head of the vehicle operator. From the sheave the cable extends to a flexible tubular element mounted above the electric motor in the vehicle by a post which maintains the tubular element at a level above the vehicle operator's head. By virtue of the above-described cable-carrying structure, the vehicle is highly maneuverable between the two storage locations and is not restrained in its movement by the power cable.

The electrical power cable is insulated, the reel is dust-proof and explosion-proof, the electric motor of the vehicle is enclosed in a dust-proof explosion-proof cover and the driving belts connected to the motor are of the static electricity-dissipating type. In this manner the danger of igniting the dusty, combustible bulk material is substantially eliminated. This danger of combustion is a serious one when vehicles or loaders having internal combustion engines are used. Another disadvantage of vehicles powered by internal combustion engines is that the motor and associated parts cannot be made dust-proof. As a result, the motor and many of the parts, such as the radiator, air filter, etc., become clogged with dust and the time and expense required for maintenance are substantial.

Although some of the disadvantages of vehicles powered with internal combustion engines are eliminated by battery-powered vehicles, the latter also have serious drawbacks. For example, the battery must be charged periodically, thereby necessitating the stocking of additional batteries to power the vehicles while a previously used set of batteries is being recharged. This entails substantial expense for additional batteries as well as for the recharging equipment. All of these drawbacks, as well as the drawbacks in internal combustion powered vehicles, are eliminated by the subject invention.

Other features and advantages are inherent in the structure disclosed and claimed as will become apparent to those skilled in the art from the following detailed description in conjunction with the accompanying drawings wherein:

FIGURE 1 is a side elevational view, partly in section, and partly cut away, of one embodiment of a load transferring vehicle electrically powered by a cable carried by structure all constructed in accordance with the present invention;

FIGURE 2 is a top plan view of the structure shown in FIGURE 1; and

FIGURE 3 is a sectional view taken along line 3—3 in FIGURE 1.

Referring to the figures, there is shown a typical embodiment of the subject invention comprising a material loading and transferring vehicle indicated generally at 10, said vehicle having a conventional external appearance and including a conventional hydraulically operated scoop or shovel-type loader 11, useable for transferring dusty, combustible bulk material from a first predetermined storage location, such as the interior of a railroad boxcar 50 spotted on a railroad siding alongside a dock 31 and in a position located to the right of the grate-like bridge 30 as viewed in FIGURES 1 and 2. Vehicle 10 crosses bridge 30 into boxcar 50, scoops up material, and recrosses the bridge with a load of material which is carried by the vehicle along platform or dock 31 to a second predetermined storage location, such as a bin or hopper (not shown). Vehicle 10 and hydraulically operated shovel 11 are driven by an electric motor 12 mounted at the rear of vehicle 10 and powered by an overhead electric cable indicated generally at 13 and carried by structure now to be described in detail.

Located above platform 31 and extending therealong are a pair of channel-shaped members or joists 15, 16. Channel 15 mounts a dust-proof, explosion-proof, spring-tensioned cable-retracting reel 14 of conventional construction. Adjustably connected to channel 16 is a pivotal rotatable sheave 17 constituting cable supporting and guiding means, the sheave 17 being vertically offset relative to the reel and being located between reel 14 and the first storage location. Sheave 17 is rotatable about the axis of pin 26 and is pivotally mounted on an upwardly inclined pin 27 terminating in a ring 48 fixed around a rod 18 inclined upwardly to the left as viewed in FIGURE 1 and extending from a tube 19 slideably received in one end of a larger tube 20 having its other end mounted between brackets 22 on channel 16. Sheave 17 may be raised or lowered to retracted or extended positions by sliding tube 19 in or out of tube 20 to a predetermined extension for tube 19, the latter being locked in position by a pin 21 extending through aligned holes 48 (FIGURE 2) in tubes 19 and 20. The operative position for sheave 17 is one in which it extends just below the doorway top 49 of the boxcar 50 or other storage location from which material is being transferred. Tube 20 is supported in the inclined position shown in FIGURE 1 by a pair of braces 23 (FIGURE 2) each having one end connected to a collar 46 on tube 20 and another end fixed to channel 16. Another way to raise or lower sheave 17 would be to remove braces 23, pivotally mount tube 20 between brackets 22 with a pin 51, and attach an upwardly extending adjusting cable to tube 19 or 20.

As shown in FIGURE 1, cable 15 extends from reel 14 around sheave 17 and then downwardly through a flexible tube 24 connected by a clamp 47 to the top of a hollow post or tubular member 25 constituting an antenna extending upwardly from the rear hood 28 of vehicle 10. Cable 13 extends downwardly through tubular member 25 and terminates at electric motor 12.

The cable carrying structure described enables the electrically driven vehicle 10 to be operated with a high degree of maneuverability between the two storage locations. The cable is long enough to enable the vehicle to move unhindered extensively in both directions along the platform 31. Post 25 and flexible tube 24 maintain the cable 13 above the head of the vehicle operator (not shown) when the latter is seated in a vehicle-operating position on the vehicle seat 39. Flexible tube 24 is at no time higher than sheave 17, even when the sheave is at its lowermost extended position. As a result the cable portion extending between sheave 17 and flexible tube 24 always extends upwardly from flexible tube 24. Spring-tensioned retracting reel 14 constantly maintains the cable taut. Even when the vehicle has travelled a considerable distance along the platform 31 away from a position beneath reel 14, the cable portion between sheave 17 and post 25 can be prevented from sagging due to the weight of this unsupported cable portion merely by providing a reel with sufficient retracting force.

Since vehicle 10 may be used to transfer dusty, combustible bulk material, the vehicle and the cable carrying structure are constructed to avoid accidental ignition of combustible material. More specifically, reel 14 is dust-proof and explosion-proof, cable 13 is electrically insulated, and the electric motor 12 is enclosed within a dust-proof housing. Motor 12 mounted on the vehicle chassis drives a shaft 32 mounting a sheave 33 around which extend a plurality of continuous V-belts 34 also extending around a lower sheave 35 mounted on a lower shaft 36 connected at opposite ends to a hydraulic pump 37 and the vehicle transmission 38. Belts 34 are of a static-electricity-dissipating type to avoid igniting the dusty, combustible material.

A practical embodiment of the subject invention was made by converting a vehicle normally equipped with a rear mounted 33 H.P. liquid propane gas internal combustion engine and a hydraulically operated scoop. The engine was replaced with a 30 H.P. 1750 r.p.m., dust proof, explosion proof, electric motor drivingly connected to the transmission and hydraulic pump of the vehicle as illustrated in FIGURES 1 and 3 of the drawings.

The reel used was an explosion proof, dust proof, retractable reel with fifty feet of No. 8, four wire cable. The reel was mounted ten feet above the dock and about eight feet back from the doorway of a spotted boxcar. During material transferring operations, the cable was maintained taut at all times. Conversion of the vehicle from the L.P. gas internal combustion engine to the electric motor eliminated 95% of the maintenance time formerly spent on the vehicle, and resulted in a very favorable change in the insurance classification of the vehicle.

The foregoing detailed description has been given for clearness of understanding only, and no unnecessary limitations should be understood therefrom, as modifications will be obvious to those skilled in the art. For example, in addition to use on material transferring vehicles mounting scoops, the subject invention may be used on fork lift trucks, grapple-mounting vehicles, straddle-type vehicles, and the like.

I claim:
1. Apparatus for transferring dusty, combustible, bulk material from a first predetermined storage location to a second predetermined storage location, said apparatus comprising:
   a vehicle;
   material loading and carrying means on said vehicle;
   enclosed, dust-proof, explosion-proof electric motor means on said vehicle;
   post means extending upwardly from said vehicle and having a flexible tubular portion at the top thereof;
   dust-proof, explosion-proof, cable-retracting and tensioning reel means;
   means mounting said reel means higher than the top of said post means;
   rotatable cable-supporting and guiding means;
   means mounting said cable-supporting means higher than the top of said post means;
   insulated electric cable means for connection to a power source;
   said cable means extending continuously without a discontinuity around said reel means, over said cable-supporting means, through said flexible tubular portion and along said post means, and terminating at said electric motor means;
   said cable means being insulated continuously without a discontinuity from the reel means to the electric motor means;
   and static-electricity-dissipating belt means connected to the electric motor means for driving said vehicle and the loading means.

2. Apparatus as recited in claim 1 wherein:
   said flexible tubular portion is located sufficiently above said vehicle to maintain that part of the cable means between the tubular portion and the cable-supporting means above the head of the vehicle operator when the operator is in a vehicle operating position.

3. Apparatus as recited in claim 1 wherein:
   said cable-supporting means is offset vertically relative to said reel means and is located between said reel means and one of said storage locations;
   said reel means being disposed higher than said cable-supporting means.

4. Apparatus as recited in claim 1 wherein said cable-supporting means comprises rotatable sheave means pivotable about an axis transverse to its axis of rotation.

References Cited in the file of this patent

UNITED STATES PATENTS

| | | |
|---|---|---|
| 637,614 | Howe | Nov. 12, 1899 |
| 1,045,903 | Smith | Dec. 3, 1912 |
| 1,096,498 | Flanary | May 12, 1914 |
| 1,461,323 | Peters | July 10, 1923 |
| 2,591,250 | Gerber | Apr. 1, 1952 |
| 2,976,945 | Schreck | Mar. 28, 1961 |